(12) United States Patent
Lin et al.

(10) Patent No.: US 6,553,625 B2
(45) Date of Patent: Apr. 29, 2003

(54) POSITIONING HINGE

(75) Inventors: Wen-Chi Lin, Hsinchu (TW); Wen-Hao Tai, Hsinchuang (TW)

(73) Assignee: Chung-Nan Hsteh (TW)

( * ) Notice: Subject to any disclaimer, the term of this patent is extended or adjusted under 35 U.S.C. 154(b) by 0 days.

(21) Appl. No.: 10/014,306

(22) Filed: Nov. 13, 2001

(65) Prior Publication Data
US 2003/0056327 A1 Mar. 27, 2003

(30) Foreign Application Priority Data
Aug. 16, 2001 (TW) ...................... 90214053 U

(51) Int. Cl.⁷ .......................... E05C 17/64; E05D 11/08
(52) U.S. Cl. ............................. 16/342; 16/341; 16/339; 361/681
(58) Field of Search .................. 16/342, 341, 337, 16/338, 339; 361/680, 681; 403/119, 120; 379/433.13

(56) References Cited
U.S. PATENT DOCUMENTS 4,730,364 A * 3/1988 Tat-Kee ...................... 361/681
5,077,551 A * 12/1991 Saitou ........................ 361/681
5,715,575 A * 2/1998 Kubota ........................ 16/342
6,108,868 A * 8/2000 Lin ............................. 16/341
6,233,139 B1 * 5/2001 Hamon ....................... 361/681
6,470,175 B1 * 1/2002 Park ....................... 379/433.13

* cited by examiner

*Primary Examiner*—Anthony Knight
*Assistant Examiner*—Doug Hutton
(74) *Attorney, Agent, or Firm*—Ladas & Parry

(57) ABSTRACT

A positioning hinge for providing pivotal positioning is disclosed.

The positioning hinge comprises a pivotal member, a pivotal base, a first torsion spring and a friction device. The friction device includes a positioning element and a slide-friction member, which are kept in a resilient friction contact with each other by means of a resilient mechanism. This enables the LCD display to be opened due to the pivoting action of the pivotal base under the results of resilience and frictional positioning. It is appreciated that the above features advantageously result in an appropriate reduction in the opening speed of the LCD display while at the same time obtaining a steady frictional pivotal positioning, thereby prolonging the working life of the positioning hinge.

14 Claims, 8 Drawing Sheets

POSITIONING HINGE

FIELD OF THE INVENTION

The present invention relates to a positioning hinge, particularly to a positioning hinge for pivoting between a main unit and an LCD display of a portable computer or electronic dictionary, which can adjust the pivot orientation of the LCD display.

BACKGROUND OF INVENTION

LCD displays of conventional portable computers are generally pivotally assembled on main units by a pair of hinges. U.S. Pat. No. 6,108,868 issued on Aug. 29, 2000 to Davys Lin discloses a positioning hinge having a cam block and a resilient friction member mounted on a pivotal base. The resilient friction member resiliently presses against the surface of the cam block to achieve the purpose of adjusting the orientation of the LCD display relative to the main unit. It is true that the '868 patent successfully achieves its predetermined purposes. However, because its resilient friction member is mounted on the pivotal member, the friction between the resilient friction member and the cam block has an undesirable, sudden change due to the complicated contour of the cam surface. That is, as the peripheral surface of the cam block diminishes in diameter, the friction force will be greatly reduced at the same time. This results in an unsmooth swinging of the LCD display. In details, the torsion spring constantly has a great torsion force during the swinging of the LCD display. When the LCD display suddenly stops due to the pivot positioning effect, the great torsion force in the torsion spring will shake the main unit and the LCD display due to the inertia in the display. In view of this defect, there is a need to provide an improved positioning hinge having a cushioning mechanism so as to obtain a relatively longer life.

SUMMARY OF THE INVENTION

The object of the present invention is to provide an improved positioning hinge having the following advantages: (a) it provides a resilient swinging operation to the LCD display; (b) it allows a user to adjust the orientation of the LCD display when the display is resiliently swung to a predetermined viewing angle so as to adapt to ambient lighting; (c) it provides a smooth swinging operation to the LCD display so as to correct the positioning defects between the main unit and the display; and d) it provides a cushioning mechanism to the friction structure so as to reduce the wear between the hinge components.

To achieve the above intended purposes, the positioning hinge according to the present invention essentially comprises a pivotal member, a pivotal base, a first torsion spring and a friction device.

According to one embodiment of the present invention, the pivotal member is secured to a main unit and has a rotary shaft having a rotary axis. The pivotal base is secured to the LCD display and essentially includes a first support through which the rotary shaft passes so that the rotary shaft can pivot thereabout. The torsion spring has two ends which bias against the pivotal member and pivotal base, respectively, thereby providing a torsion force to allow the pivotal base to rotate with respect to the pivotal member so as to result in a relative pivotal movement between the display and the main unit. The positioning element formed with a friction surface is non-rotatably installed around the rotary shaft. The resilient compression member includes a slide-friction member and a resilient mechanism, wherein the resilient mechanism is provided between the pivotal base and the slide-friction member so that there is always a cushioning frictional contact between the slide-friction member and the positioning member.

The above and other features and advantages of the present invention may be realized from the accompanying drawings and the following descriptions.

DETAILED DESCRIPTION OF THE INVENTION

Figure 1:
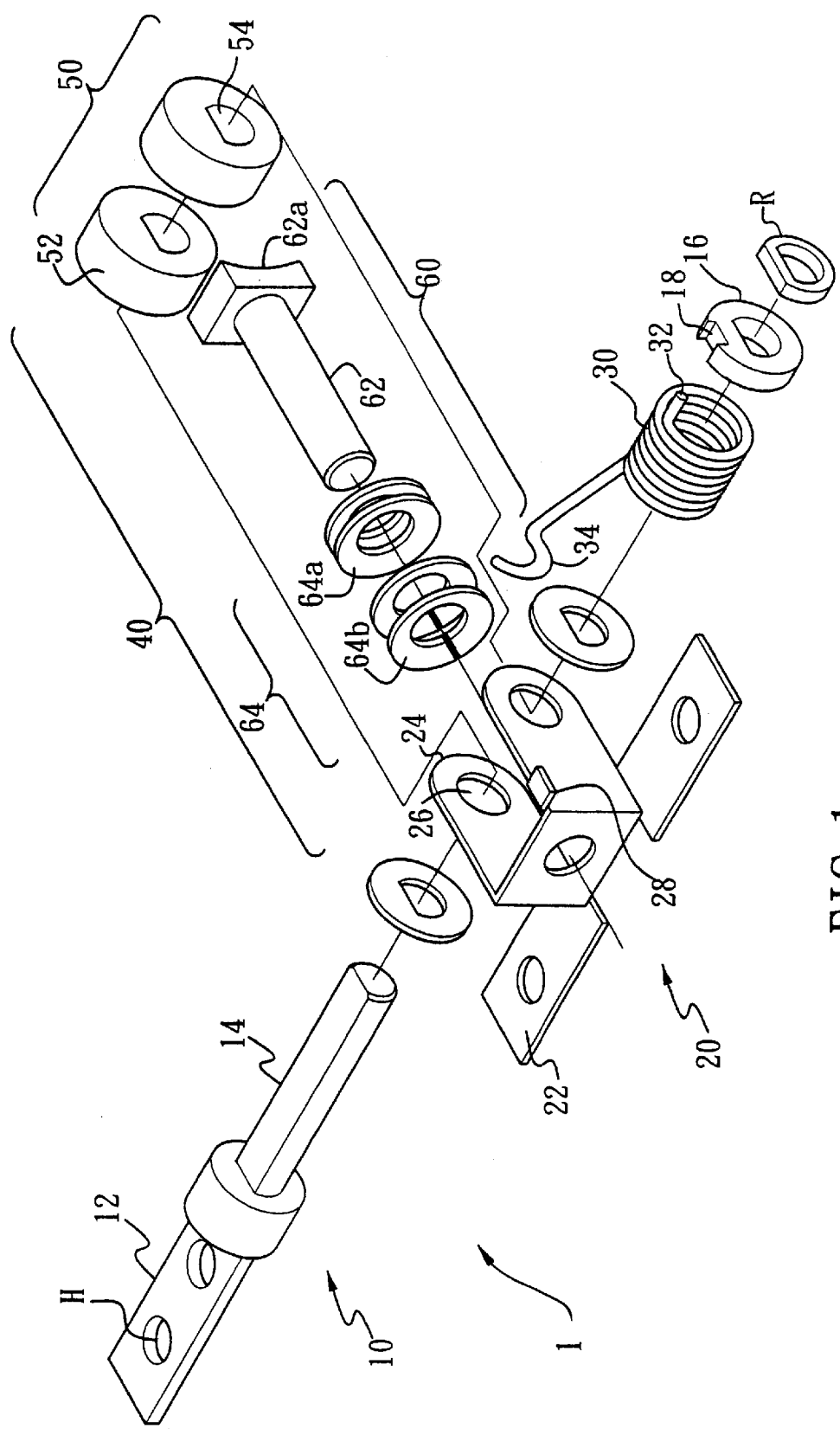
FIG. 1 is an exploded perspective view of a first embodiment of the present invention.
Figure 2:
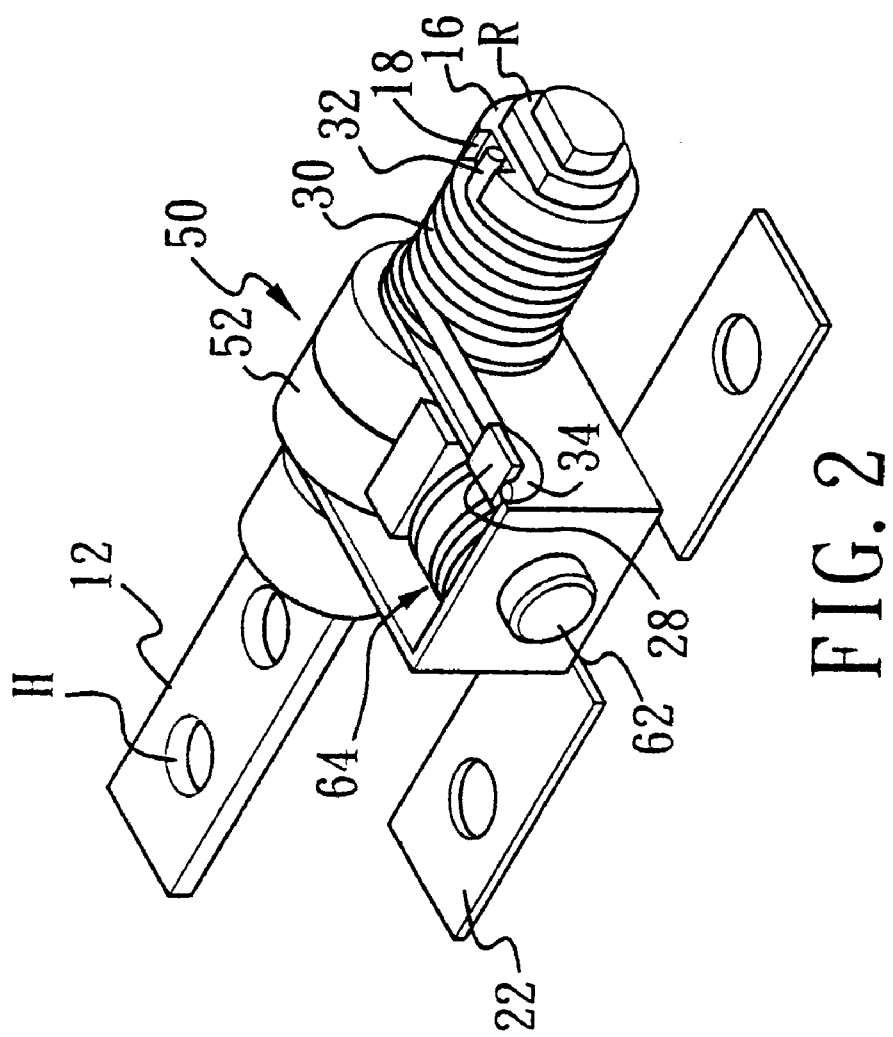
FIG. 2 is an assembled perspective view of the embodiment of FIG. 1.

FIGS. 1 and 2 illustrate a positioning hinge 1 according to a first embodiment of the present invention. The positioning hinge 1 generally comprises a pivotal member 10, a pivotal base 20, a first torsion spring 30, a friction device 40 and a fastening member R.

The pivotal member 10 comprises a mounting end 12 and a rotary shaft 14. The mounting end 12 may further comprise holes H for mounting the pivotal member 14 to a main unit M (see FIGS. 3A–3D). The rotary shaft 14 having a rotary axis preferably extends to a cylindrical shape.

The pivotal base 20 comprises one or one pair of mounting part(s) 22 and at least one first support 24. The mounting part 22 mounts the pivotal base 20 to an LCD display D (see FIGS. 3A–3D). The support 24 is formed with a pivotal opening 26 through which the rotary shaft 14 passes. The pivotal base 20 is assembled to the pivotal member 10 through the pivotal opening 26 which allows the pivotal base 20 to rotate about the rotary axis of the pivotal member 10 between a first position (i.e., the LCD display being at a closed state) illustrated in FIG. 3A and a second position (i.e., the LCD display being at an open state) illustrated in FIGS. 3B–3D.

The first torsion spring 30 provided around the rotary shaft 14 has a first end 32 and a second end 34 biasing against the pivotal member 10 and the pivotal base 20, respectively, to provide a torsion force to allow the pivotal base 20 to rotate about the pivotal member 10. The couplings between the first end 32 and pivotal member 10 and between the second end 34 and the pivotal base 20 may be achieved by various structures. For example, it is preferable to provide a notch-type mounting ring 16 having a notch 18 on the pivotal member 10 and a tab 28 on the pivotal base 20.

The friction device 40 comprises a positioning element 50 and a resilient compression member 60. The positioning element 50 comprises a friction surface 52 and a through hole 54. The friction surface 52 generally shapes as a cam sidewall surrounding the rotary axis. The through hole 54 is configured to facilitate the positioning element 50 being non-rotatably assembled to the rotary shaft 14.

The resilient compression member 60 comprises a slide-friction member 62 and a resilient mechanism 64. The slide-friction member 62 has a longitudinal axis supported by the pivotal base 20 and a contact surface 62a directly contacting the friction surface 52 of the positioning element 50. The resilient mechanism 64 biases the slide-contact member 62 between the pivotal base 20 and the positioning element 50. The resilient mechanism 64 preferably consists of at least one of disk springs 64a and slit-type disk springs 64b. Other appropriate resilient mechanism 64 includes arc-shaped resilient washers (not shown), wavy-shaped resilient washers (not shown), or a single spiral spring (not shown).

After the members (10,20,30,40) are assembled to the pivotal member 10, a ring-type fastening member R may be provided to secure these members in place so as to constitute the positioning hinge 1. The ring-type fastening member R may be replaced by a nut-type fastening member N (see FIG. 4) or a collar-type fastening member C (see FIG. 5).

Figure 3C:
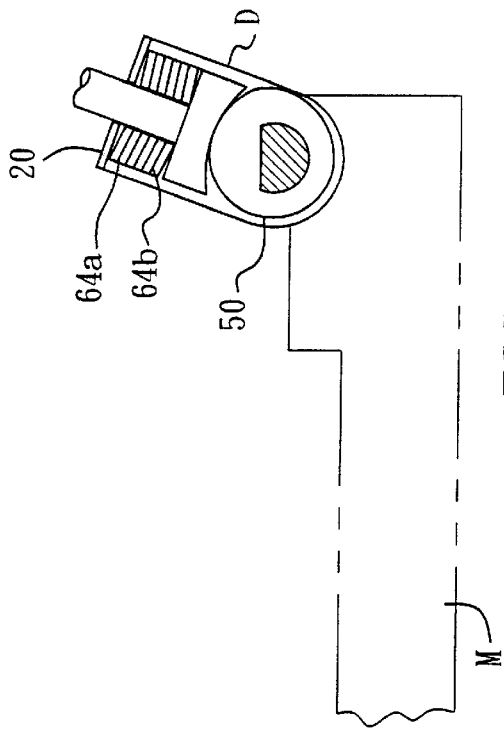
FIGS. 3A–3D are schematic views illustrating the positioning hinge being assembled to a portable computer.
Figure 3D:
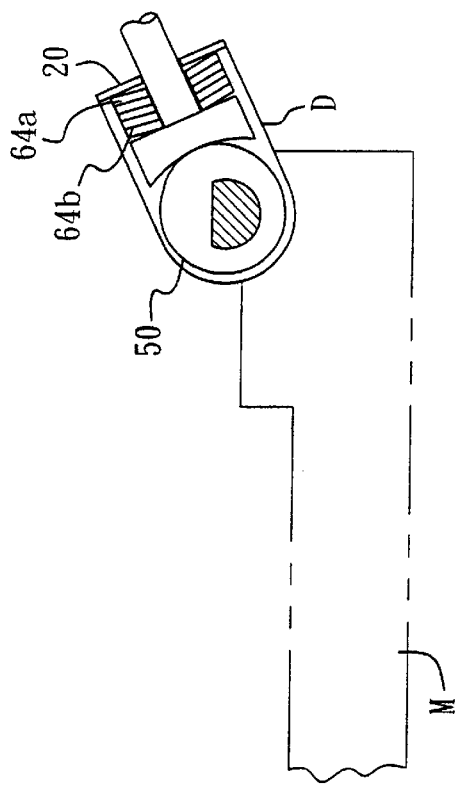
Figure 3A:
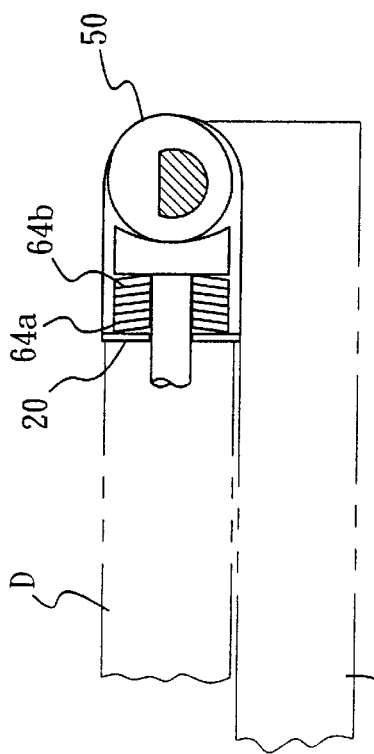
Figure 3B:
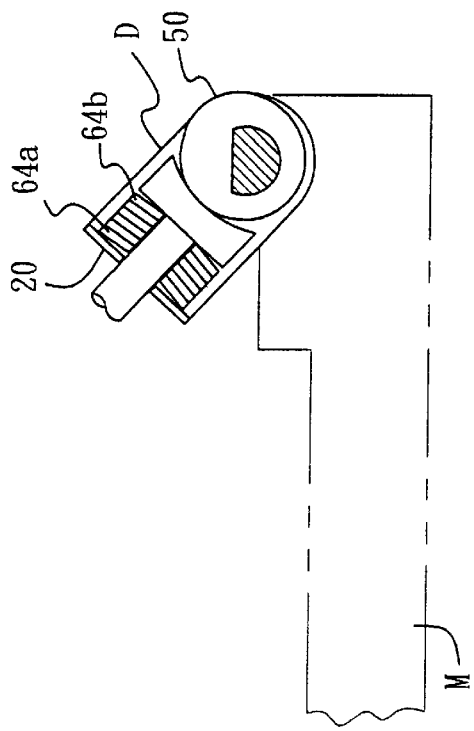

FIGS. 3A–3D are schematic views illustrating the operational states among the LCD display D, main unit M, positioning element 50 and resilient compression member 60 after the positioning hinge 1 is assembled to the computer. Before the LCD display D is swung open, the LCD display D is maintained at a closed position (FIG. 3A) adjacent to the main unit M by means of fastening means (such as fasteners); the first torsion spring 30 (not illustrated in FIGS. 3A–3D) is under a torsion state, and the positioning element 50 has a smallest radius at this state in which the disk springs 64a,b are in a relaxed condition. As a user opens the LCD display D by pushing a release switch or by other methods, the torsion energy in the torsion spring 30 will urge the LCD display D to swing up automatically such that the pivotal base 20 rotates about the pivotal axis until the swinging action slows at a position where the positioning element 50 slightly increases in radius (FIG. 3B). At this state, the disk springs 64a,b withstand a pressure from the positioning element 50 due to the increased radius and the resilience of the disk springs 62a,b forces the contact surface 62a to keep in a closer contact with the friction surface 52. FIG. 3C illustrates an example operating viewing angle (which is larger than 90 degrees) where the swinging action stops and the positioning element 50 has a greater radius than the radius shown at the state of FIG. 3B. Finally, the user may further adjust the LCD display D to attain an optimum viewing angle. In the illustrated examples of FIGS. 3A–3D, disk springs 64a,b continue to resiliently pressure the slide-friction member 62. It is preferable that the swinging operation from FIGS. 3A–3C results in a smoothly-increased friction urging by the disk springs 64a,b, while the swinging operation form of FIGS. 3C–3D continues this resilient urging so as to maintain a greater friction force.

Figure 4:
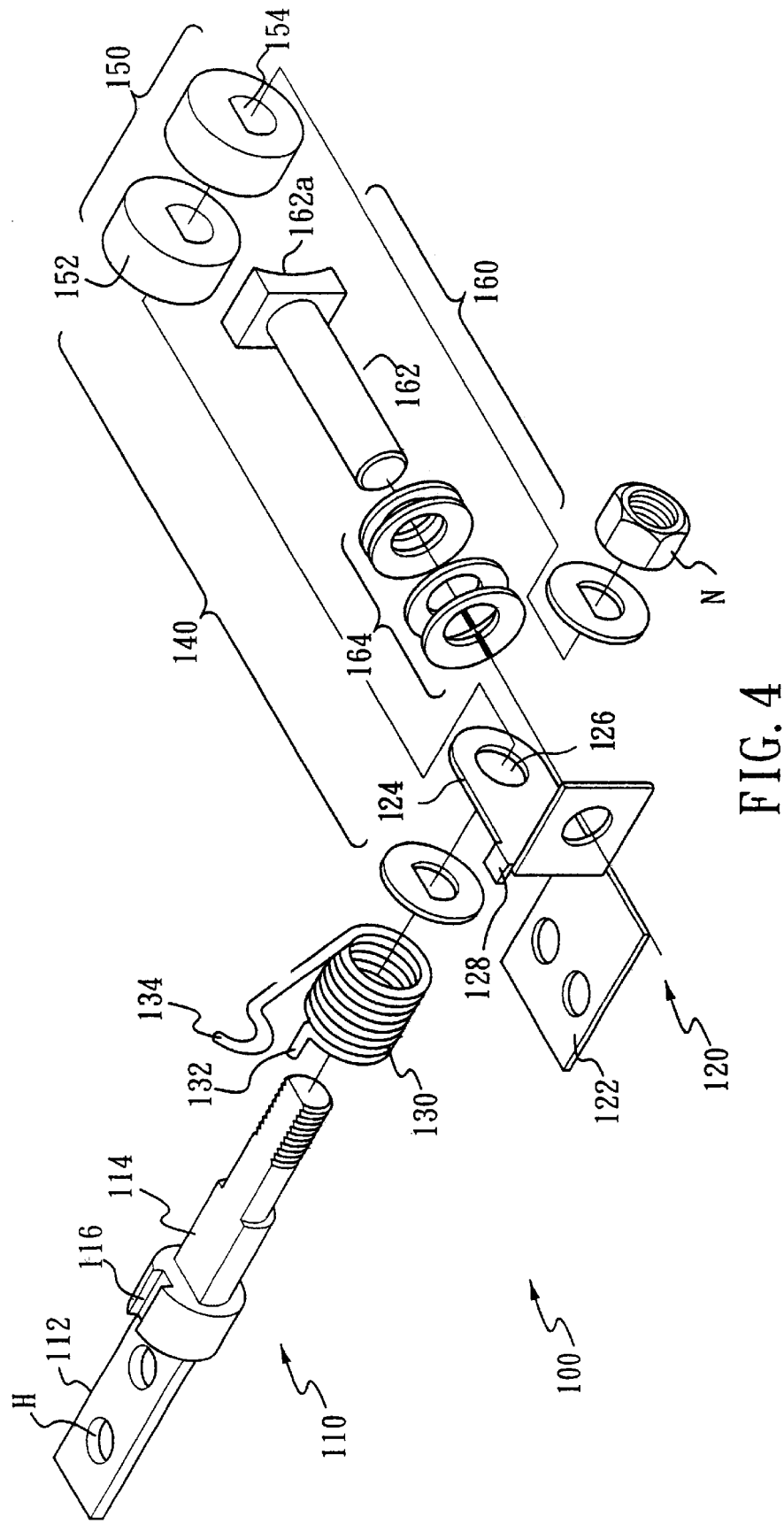
FIG. 4 is an exploded perspective view of a second embodiment of the present invention.

FIG. 4 illustrates a second embodiment of a positioning hinge 100 according to the present invention, which comprises a pivotal member 110, a pivotal base 120, a torsion spring 130 and a friction device 140.

The pivotal member 110 comprises a mounting end 112 and a rotary shaft 114. The pivotal base 120 comprises a mounting part 122 and a first support 124. The first support 124 is formed with a pivotal opening 126. The first torsion spring 130 is provided around the rotary shaft 114 and has a first end 132 and a second end 134 biasing against the pivotal member 110 and the pivotal base 120, respectively. The friction device 140 comprises a positioning element 150 and a resilient compression member 160. The resilient compression member 160 comprises a slide-friction member 162 and a resilient mechanism 164. The slide-friction member 162 has a longitudinal axis supported by the pivotal base 120. The resilient mechanism 164 biases the slide-contact member 162 between the pivotal base 120 and the positioning element 150.

Figure 5:
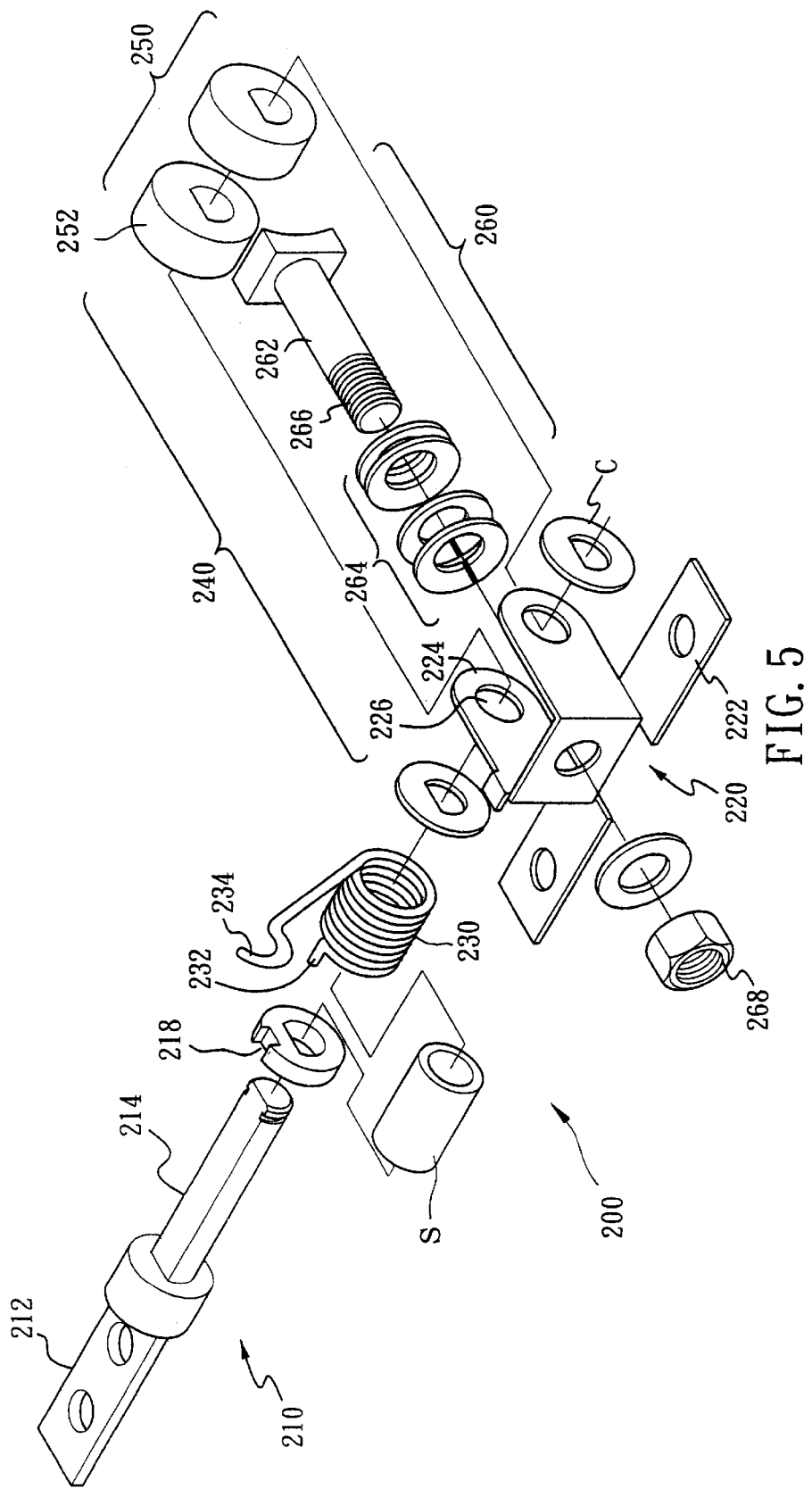
FIG. 5 is an exploded perspective view of a third embodiment of the present invention.
Figure 6:
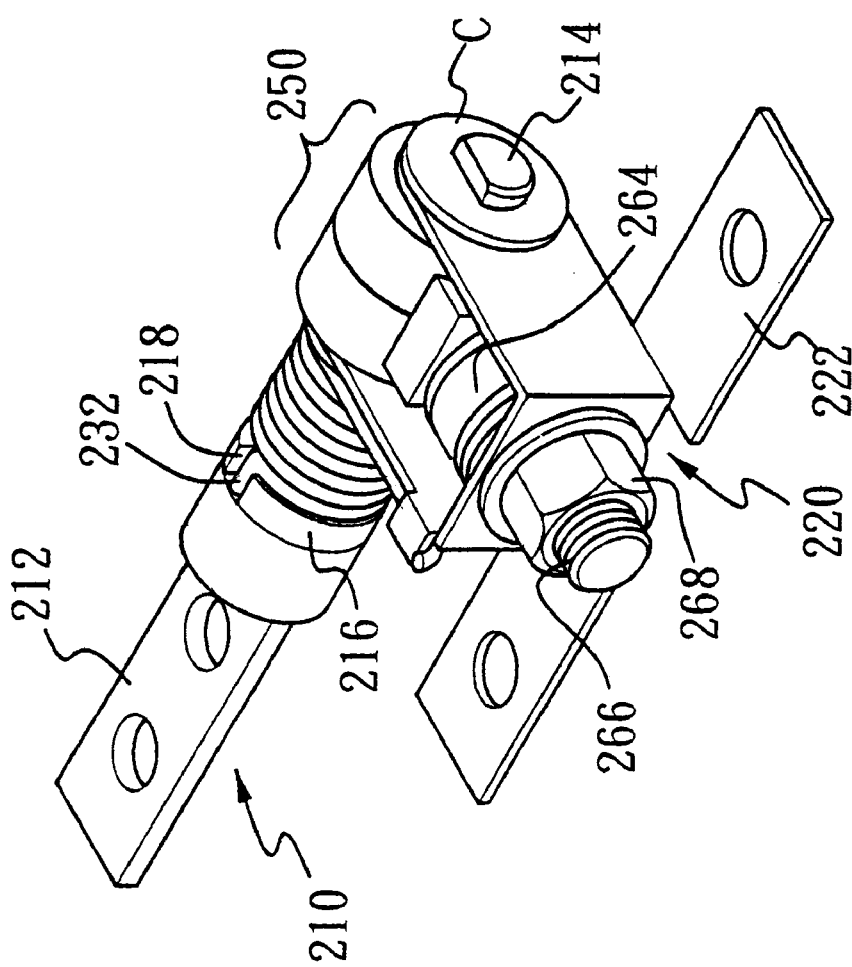
FIG. 6 is an assembled perspective view of the embodiment of FIG. 5.
Figure 7:
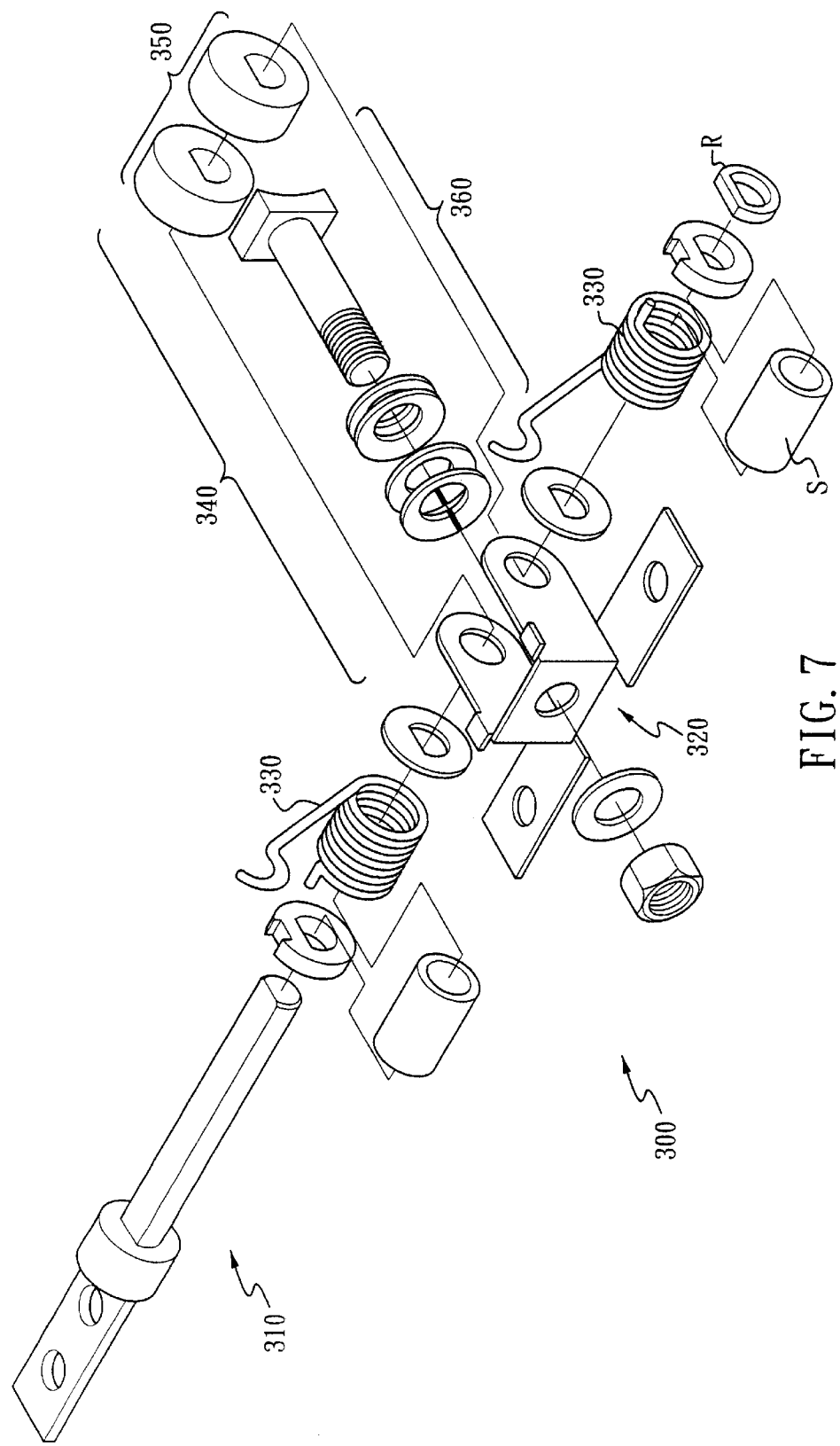
FIG. 7 is an exploded perspective view of a forth embodiment of the present invention.
Figure 8:
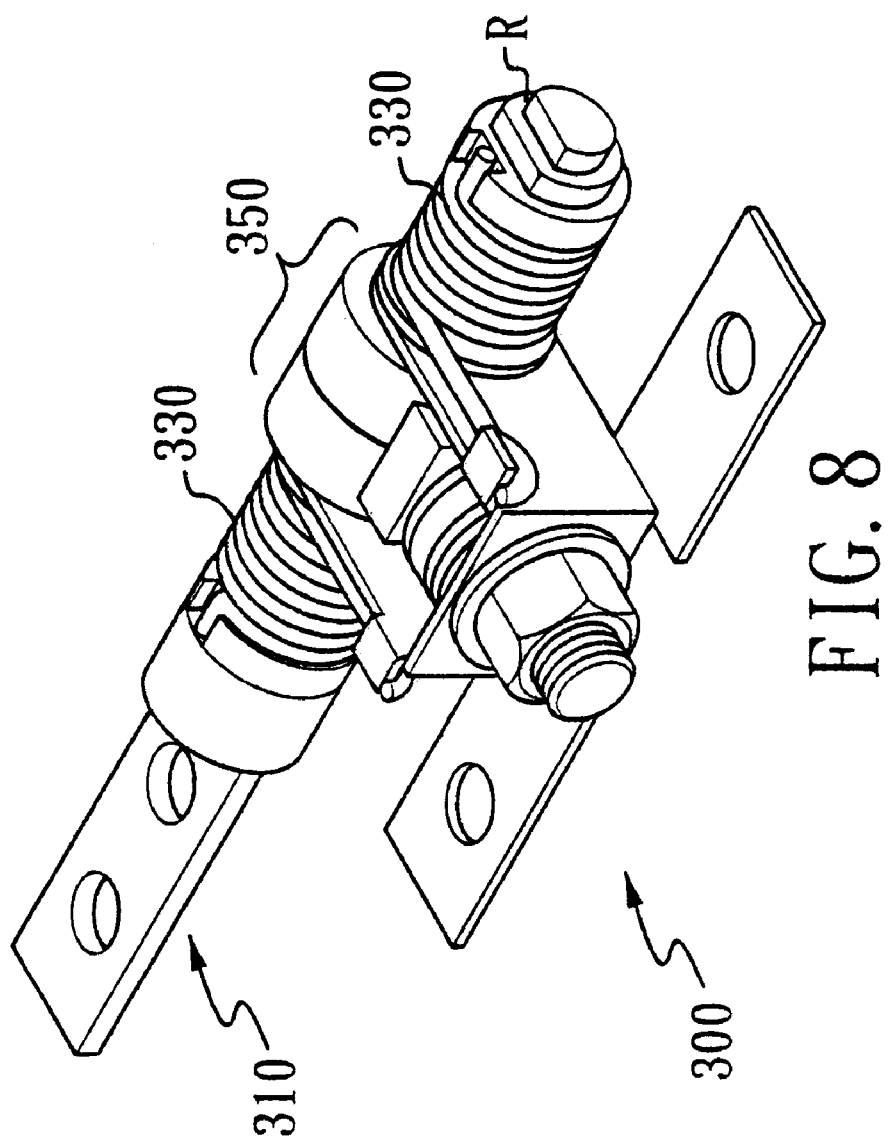
FIG. 8 is an assembled perspective view of the embodiment of FIG. 7.

FIGS. 5 and 6 illustrate a third embodiment of a positioning hinge 200 according to the present invention. The positioning hinge 200 comprises a pivotal member 210, a pivotal base 220, a first torsion spring 230, a friction device 240 including a positioning element 250 and resilient compression member 260, and a fastening member C. The pivotal member 210 comprises a mounting end 212, a rotary shaft 214, and a notch-type mounting ring. The pivotal base 220 comprises at least one mounting part 222 and at least one first support 224. The first torsion spring 230 has a first end 232 and a second end 234 biasing against a notch 218 of notch-type mounting ring 216 and the pivotal base 220, respectively. A sleeve S may be fitted into the first torsion spring to avoid the leakage of the lubricant oil. The resilient compression member 260 comprises a slide-friction member 262 and a resilient mechanism 264. The slide-friction member 262 has a longitudinal axis supported by the pivotal base 220. The resilient mechanism 264 biases the slide-contact member 262 between the pivotal base 220 and the positioning element 250. When the pivotal base 220 rotates, the slide-friction member 262 will slide on the friction surface 252 of the positioning element 250, thereby traveling along its longitudinal axis depending on the ups or downs of the friction surface 252 under the biasing of the resilient mechanism 264. The operation of positioning hinge 200 is identical to that shown in FIGS. 3A–3D.

The slide-friction member 262 preferably further comprises a tuning device (266,268) that couples with the pivotal base 220 to limit the axial movement of the slide-friction member 262. The tuning device (266,268) allows a user to manually adjust the tightness degree of contact between the slide-friction member 262 and the positioning element 250. The tuning device preferably consists of a threaded portion 266 formed on the slide-friction member 262 and a nut 268 mating with the threaded portion 266.

As the invention has been particularly described with respect to preferred embodiments thereof, persons skilled in the art will understand that the above and other changes in form and detail may be made without departing from the scope and spirit of the invention.

What is claimed is:

1. A positioning hinge for pivoting between a main unit and an LCD display, comprising:

a pivotal member having a mounting end and a rotary shaft, wherein the mounting end is mounted on the main unit, and the rotary shaft has a rotary axis;

a pivotal base having a mounting part mounted on the display, and a first support through which the rotary shaft passes; wherein the pivotal base is rotatable between a first position and a second position about the pivotal member;

a first torsion spring biasedly provided around the rotary shaft, the first torsion spring having a first and a second ends biasing against the pivotal member and the pivotal base, respectively, thereby providing a torsion force to allow the pivotal member to rotate with respect to the pivotal base;

a friction device comprising:
- a positioning element having a friction surface and a through hole, wherein the friction surface generally shapes as a cam sidewall surrounding the rotary axis, and wherein the through hole allows the positioning element to be non-rotatably installed around the rotary shaft;
- a resilient compression member comprising a slide-friction member and a resilient mechanism, wherein the slide-friction member has a longitudinal axis supported by the pivotal base and the resilient mechanism biases the slide-friction member between the pivotal base and the friction surface of the positioning element, so that, when the pivotal base is rotated, the slide-friction member will move along its longitudinal axis depending upon the contour of the friction surface and the biasing of the resilient mechanism;

wherein the pivotal member, pivotal base, first torsion spring and friction device are secured to the rotary shaft from a free end of the rotary shaft.

2. The positioning hinge as set forth in claim 1, wherein the pivotal member is formed with a notch for receiving the first end of the first torsion spring.

3. The positioning hinge as set forth in claim 1, wherein the pivotal member further comprises a notch-type mounting ring for receiving the first end of the first torsion spring.

4. The positioning hinge as set forth in claim 1, wherein the free end is coupled to a washer or a nut to facilitate the pivotal member, pivotal base, first torsion spring and friction device being secured thereto.

5. The positioning hinge as set forth in claim 1, wherein the resilient mechanism consists of at least one resilient washer.

6. The positioning hinge as set forth in claim 5, wherein the resilient washer has a slit.

7. The positioning hinge as set forth in claim 5, wherein the resilient washer is in an arc shape or in a wavy shape.

8. The positioning hinge as set forth in claim 5, wherein the resilient washer includes a spiral spring.

9. The positioning hinge as set forth in claim 1, wherein the resilient mechanism consists of at least one disk spring.

10. The positioning hinge as set forth in claim 9, wherein the disk spring has a slit.

11. The positioning hinge as set forth in claim 1, wherein the pivotal base further comprises a second through which the rotary shaft passes, said second support being substantially symmetrical, parallel to and spaced from the first support.

12. The positioning hinge as set forth in claim 11, further comprising a second torsion spring opposite the first torsion spring, wherein two ends of the second torsion spring bias against the pivotal member and the pivotal base, respectively.

13. The positioning hinge as set forth in claim 1, wherein the slide-friction member further comprises a tuning device, said tuning device coupling with the pivotal base for restricting the axial movement of the slide-friction member.

14. The positioning hinge as set forth in claim 13, wherein the tuning device consists of a threaded portion formed on the slide-friction member and a nut mating with the slide-friction member.

* * * * *